(12) United States Patent
Parent

(10) Patent No.: US 6,688,804 B1
(45) Date of Patent: Feb. 10, 2004

(54) HITCH RECEIVER/IMPLEMENT THREADED FASTENING ASSEMBLY

(75) Inventor: Richard Arthur Parent, Edmonton (CA)

(73) Assignee: Par-Ten Products Ltd., Edmonton (CA)

( * ) Notice: Subject to any disclaimer, the term of this patent is extended or adjusted under 35 U.S.C. 154(b) by 0 days.

(21) Appl. No.: 09/411,841

(22) Filed: Oct. 4, 1999

Related U.S. Application Data

(60) Provisional application No. 60/103,535, filed on Oct. 8, 1998.

(51) Int. Cl.$^7$ .................................................. B60P 3/06
(52) U.S. Cl. ...................... 403/379.3; 403/345; 280/506
(58) Field of Search .......................... 280/506; 403/376, 403/377, 378, 379.1, 379.3, 379.6, 345, 361, 108

(56) References Cited

U.S. PATENT DOCUMENTS

| | | | |
|---|---|---|---|
| 3,572,778 A | * 3/1971 | Cassel | ......................... 403/281 |
| 4,050,714 A | 9/1977 | Epp | |
| 4,131,296 A | 12/1978 | Strader | |
| 4,190,377 A | * 2/1980 | Pleuss | ......................... 403/108 |
| 4,552,377 A | 11/1985 | Folkerts | |
| 4,746,138 A | 5/1988 | James | |
| 4,773,668 A | 9/1988 | Muonro | |

(List continued on next page.)

FOREIGN PATENT DOCUMENTS

GB    2 235 668    * 9/1989

OTHER PUBLICATIONS

C.R. Brophy Machine Works Inc. catalogue, p. 10, 2" Receiver Stabilizer Bracket.

Bauer Vehicle Gear, "Anti–Wobble Stick" and "Hitch Pin Lock".
Swagman–Danik Industries Ltd., "Locking Hitch Pins".
Reese catalogue, security items.
Computer print–out re "Clamptite Trailer Hitch Brace".
Stagnarkway 1998 catalogue, p. 416, "Rattle–Free Ball Mount".
Computer print–out re Blue Ox "Receiver Locks".
Surco Products catalogue, "The Eliminator" OSI Bike Rack.
Transfo–Rakzs catalogue, 2" stabilizer.
Draftmaster advertisement for "Security Hitch Bolt".
Draw–Tite Inc., photo of Hitch Lock.

*Primary Examiner*—John R. Cottingham
(74) *Attorney, Agent, or Firm*—Oyen Wiggs Green & Mutala

(57) ABSTRACT

This invention relates to a novel hitch receiver/implement threaded fastening assembly. More particularly, this invention pertains to a novel device for securing in place an implement such as a tow bar, ball mount, bicycle rack, and the like, in a hitch receiver mounted on a vehicle. The device replaces a conventional draw pin. A device for removably securing an implement to a hitch receiver comprising a resilient elongated double "U"-shaped frame which at a first central location bends in a "U"-shape along a first plane, and the pair of arms of the frame at a pair of complementary second locations on the frame, bending in a pair of "U"-shapes in parallel along a second plane perpendicular to the first plane, a first nut secured within one of the arms of the second "U"-shape, and a second nut secured within the other of the arms of the second "U"-shape, the first and second nuts being spaced and aligned in parallel arrangement with one another. A pair of bolts and lock washers are used in combination with the device for securing the implement to the hitch receiver. By using the device, and the bolts, the walls of the implement and the hitch receiver are tightly cinched together and movement therebetween is eliminated.

3 Claims, 3 Drawing Sheets

U.S. PATENT DOCUMENTS

| | | | |
|---|---|---|---|
| 4,807,899 A | | 2/1989 | Belcher |
| 4,817,978 A | | 4/1989 | James |
| 4,856,686 A | * | 8/1989 | Workentine |
| 5,000,067 A | | 3/1991 | Kolbusz et al. |
| 5,011,178 A | | 4/1991 | Sanderson |
| 5,244,133 A | * | 9/1993 | Abbott et al. |
| 5,322,315 A | | 6/1994 | Carsten |
| 5,333,888 A | | 8/1994 | Ball |
| 5,344,175 A | * | 9/1994 | Speer |
| 5,380,030 A | | 1/1995 | Gullickson |
| 5,423,566 A | | 6/1995 | Warrington et al. |
| 5,540,065 A | | 7/1996 | Wyers |
| 5,593,172 A | | 1/1997 | Breslin |
| 5,615,904 A | | 4/1997 | Van Dusen et al. |
| 5,685,686 A | | 11/1997 | Burns |
| 5,730,456 A | | 3/1998 | Bowers |
| 5,823,560 A | | 10/1998 | Van Vleet |
| 6,099,012 A | * | 8/2000 | Mortimer ................. 280/292 X |
| 6,173,984 B1 | * | 1/2001 | Kay ........................... 280/495 |

* cited by examiner

HITCH RECEIVER/IMPLEMENT THREADED FASTENING ASSEMBLY

This non-provisional application claims under 35 U.S.C. § 119(e) the benefit of provisional application Serial No. 60/103,535, filed Oct. 8, 1998.

FIELD OF THE INVENTION

This invention relates to a novel hitch receiver/implement threaded fastening assembly. More particularly, this invention pertains to a novel device for removably securing in place an implement such as a tow bar, ball mounts, bicycle rack, and the like, in a hitch receiver mounted on a vehicle. The device replaces a conventional draw pin.

BACKGROUND OF THE INVENTION

Permanent hitches with towing balls attached to the rear of a vehicle for connecting and pulling a trailer, or other implement carrying devices, have been known for many years. More recently, to avoid having the towing ball of the hitch protrude from the rear of the vehicle, it has become common practice to have a two-part hitch installed at the rear of the vehicle. The two-part hitch typically comprises a detachable implement carrying square tube, which may or may not include a towing ball, which fits into a permanent square tube hitch receiver secured to the vehicle. The implement carrying square tube is secured to the hitch receiver by a removable draw pin, which holds the two parts together. When not in use, the implement is detached from the hitch receiver by withdrawing the draw pin.

Prior methods of attaching implements such as tow bars, ball mounts, bicycle racks, and the like to hollow square hitch receivers have many disadvantages. When a conventional securing or draw pin is used, the connection is not tight so there is undesirable movement between the implement tube and hitch receiver. This movement causes wear on both implement and hitch receiver. Excessive wear after time destroys the protective finish on both implement and hitch receiver. The unprotected implement and hitch receiver develop rust, which causes serious problems when attempting to separate the implement and hitch receiver.

It is also common for the holes in both the implement tube and the hitch receiver tube to become elongated over time due to frequent load yanking of the implement tube in the hitch receiver. This is caused by the constant starting and stopping of the towing vehicle, and the momentum weight placed on the hitch.

In an effort to reduce the slack and stabilize the implement, it is common practice to install a second apparatus such as a collar that may contain one or more bolts that are tightened against the outside of the square tube walls of the hitch receiver. Another alternative is to use a wedge-shaped device that is inserted between the walls of the square tube of the implement and the square tube of the hitch receiver.

Another problem with the conventional draw pin is that undesirable movement between the implement tube and hitch receiver transfers undesirable "play" to the in-tow vehicle, and in the case of any type of rack attached to the hitch receiver (i.e. bicycle rack), this movement is transferred to the rack and causes it to wobble. Stabilizing collars/wedges are commonly used to solve this problem.

Apart from the problems where the hitch receiver becomes stretched and the pin holes elongated, there is a security problem associated with the conventional draw pin. This is because the draw pin is easily removed and therefore makes an easy theft target. Locks for the draw pin have been developed, but these locks are subject to corrosion from road salt, and the elements, and hence become unworkable over time. Such locks are also easily broken or damaged, thereby rendering them ineffective.

Another common problem with conventional hollow square tube implement attachments and square hollow tube hitch receivers is that both tubes become concave on the sides if a single long bolt is used to fasten the two parts together. This happens when the single bolt is passed through the sidewalls of both the implement tube and the hitch receiver. The long bolt is secured with a nut which is tightened from one side only. The tightening of the single nut on the long bolt forces the sidewalls of both the receiver and implement tubes together. While such tightening will reduce slack and movement between the receiver tube and implement tubes, the irregular distorted concave shape caused by the walls of the two tubes being squeezed together, can cause considerable difficulty in attempting to separate the implement from the hitch receiver.

SUMMARY OF INVENTION

The invention is directed to an insert device for removably securing in place the square tube of a detachable implement such as a tow bar, ball mount, bicycle rack, and the like, in a larger size square tube hitch receiver. The device comprises two separate bolts and a double "U"-shaped spring metal framework, and replaces a conventional draw pin. The "spring-loaded" insert is constructed of a pair of complementary parallel and aligned nuts which are welded onto the double "U"-shape metal framework. To install, the insert is held from the open end, the two spring-loaded sides are held slightly together, and the insert is slid into the open end of the square implement tube. The insert device is inserted to the point where the pair of adjacent nuts are aligned with the two conventional pin holes that are located in the sidewalls of the square implement tube. When the two spring loaded sides are released, the resulting released tension of the framework against the interior walls of the square shaped implement tube holds the pair of nuts in place. The metal framework of the insert device prevents the pair of nuts from turning when a complementary pair of bolts are screwed in from each side through the respective pin holes and are tightened into the pair of nuts. To connect the implement tube and the hitch receiver, the square shaped tube of the implement containing the insert is placed in the square tube of the hitch receiver, and the holes in the side of the sidewalls of the hitch receiver are aligned with the holes in the sidewalls of the implement. The two bolts are then inserted, one from each side, along with lock washers, and are tightened in the nuts to conventional tightness. All movement and slack in the connection is eliminated, thereby avoiding the development of the problems discussed earlier.

The invention is directed to a device for removably securing an implement to a hitch receiver comprising; (a) a resilient elongated frame which fits within an implement; (b) a first securing member associated with the frame for securing a first side of the implement with the hitch receiver; and (c) a second securing member associated with the frame for securing a second side of the implement with the hitch receiver.

The first and second securing members can be first and second nut and bolt combinations. An end of the frame can be rounded to assist insertion of the frame into the implement. The first and second nuts can be welded to first and second sides of the frame.

The frame can be shaped as a double "U"-shaped frame with arms which at a first central location can bend in a "U"-shape along a first plane, and the pair of arms of the frame at a pair of complementary second locations on the frame, can bend in a pair of "U"-shapes in parallel along a second plane perpendicular to the first plane.

The invention is also directed to a device for removably securing an implement to a hitch receiver comprising: (a) a resilient elongated double "U"-shaped frame which at a first central location bends in a "U"-shape along a first plane, and the pair of arms of the frame at a pair of complementary second locations on the frame, bend in a pair of "U"-shapes in parallel along a second plane perpendicular to the first plane; (b) a first nut secured within one of the arms of the second "U"-shape; and (c) a second nut secured within the other of the arms of the second "U"-shape, the first and second nuts being spaced and aligned in parallel arrangement with one another.

The device can include a first bolt and a second bolt threaded to mate respectively with the first nut and the second nut. The device can include first and second lock washers for the first and second nuts.

DRAWINGS

The following drawings illustrates specific embodiments of the invention but are not to be construed as restricting or unduly limiting the spirit and scope of the overall invention.

DETAILED DESCRIPTION OF SPECIFIC EMBODIMENTS OF THE INVENTION

The invention is directed to a securing device for removably securing in place the square cross-section tube of any implement such as a tow bar, ball mount, bicycle rack, and the like, in the larger hollow square cross-section tube of a conventional hitch receiver. The device eliminates the need to use a conventional securing or draw pin to secure the implement in the hitch receiver. The disadvantages inherent in connecting a conventional implement with a conventional hitch receiver using a conventional draw pin are eliminated by using the securing device. This device eliminates all movement in the hitch receiver, thereby preventing wear, eliminating the wobble in racking implements, and reducing in-tow vehicle sway. The device eliminates the need for collars/wedges.

The draw pin is replaced by the securing device which is fitted inside the hollow square cross-section tube of the implement. The securing device inside the square tube of the implement is secured to the square tube of the hitch receiver by utilizing a pair of bolts, one bolt inserted in each side of the sidewall of the hitch receiver, together with lock washers, and tightened in the nuts of the securing device. By using the device of the invention, the walls of the implement tube and the hitch receiver are tightly cinched together and movement or slack is eliminated. The securing device thus prevents movement and attendant wear on the implement and the hitch receiver because the implement is held steady in position in the hitch receiver tube. The device eliminates the need for stabilizing collars and wedges. Furthermore, theft is deterred because wrenches are required to remove the securing bolts. The sidewalls of the implement and the hitch receiver tubes do not become distorted or concave in shape because the implement and the hitch receiver are secured together by using a pair of bolts, one from each side, rather than a single bolt which threads from one side of the hitch receiver to the other and a single nut.

Figure 1:
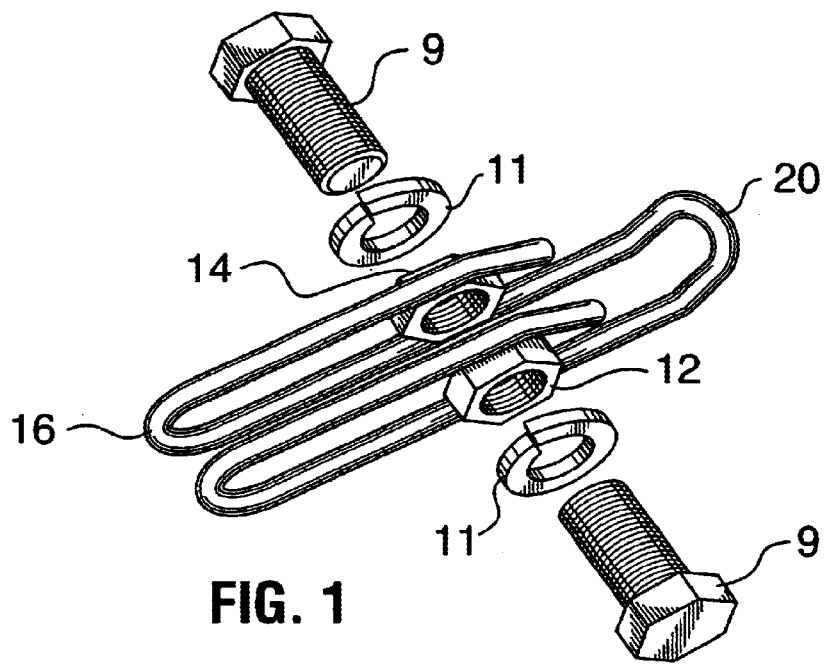
FIG. 1 illustrates an exploded isometric view of the components of the securing device, according to the invention.
Figure 2:
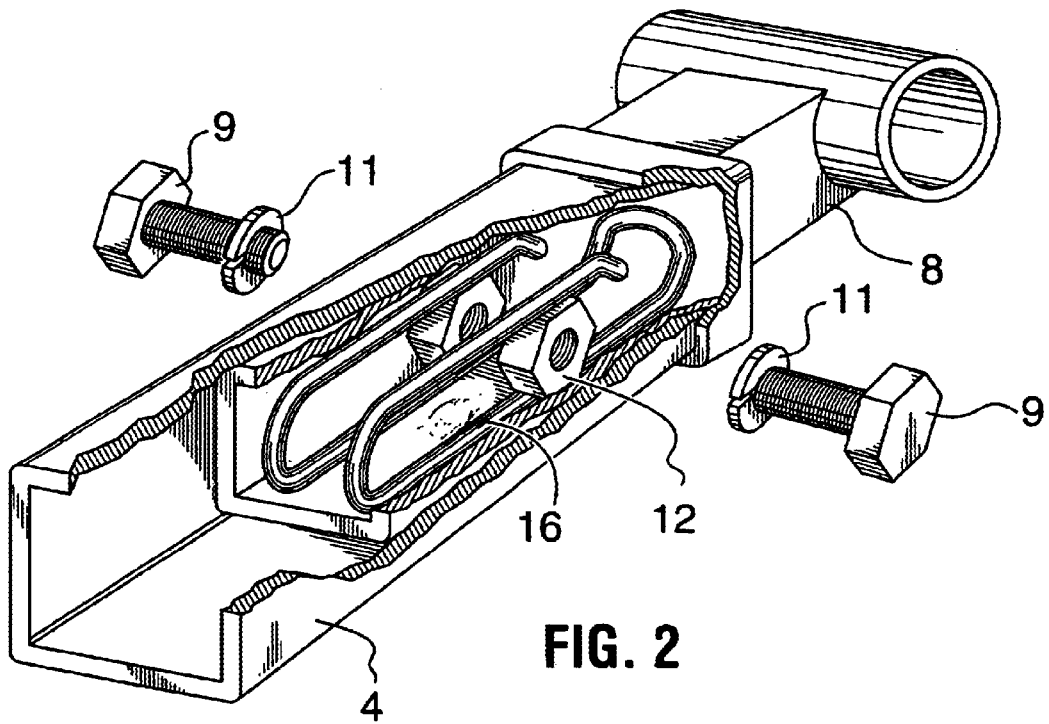
FIG. 2 illustrates an isometric partially cut-away view of the securing device installed in a standard hitch.

Referring to the drawings, FIG. 1 illustrates an exploded isometric view of the components of the securing device 10 including a pair of nuts 12, 14, a double "U-shaped" spring rod 16, a pair of bolts 9 and a pair of lock washers 11. FIG. 2 illustrates an isometric partially cut-away view of the securing device installed in an implement tube 8 and the implement tube 8 installed in the hitch receiver tube 4.

Figure 3:
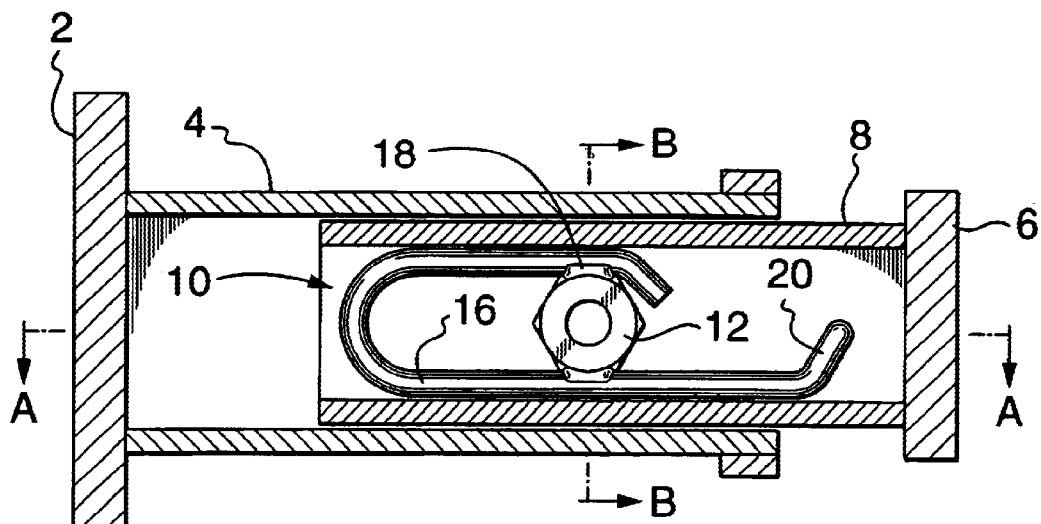
FIG. 3 illustrates a side, partial section view of the securing device held inside the tube of an implement, which in turn is held within the tube of a hitch receiver.

FIG. 3 illustrates a side partial section view of the securing device 10 held in place in the interior of the implement tube 8 of the implement 6. The implement tube 8 in turn is held in place in the interior of a hitch receiver tube 4 of a hitch receiver 2. The device is constructed of a pair of nuts 12, 14 (only nut 12 is visible in FIG. 3) and a double "U"-shaped (only one "U" is shown on this plane) spring rod 16 with a curved nose 20 at one end. The nuts are welded in place within the arms of the securing device 10 by welds 18.

Figure 4:
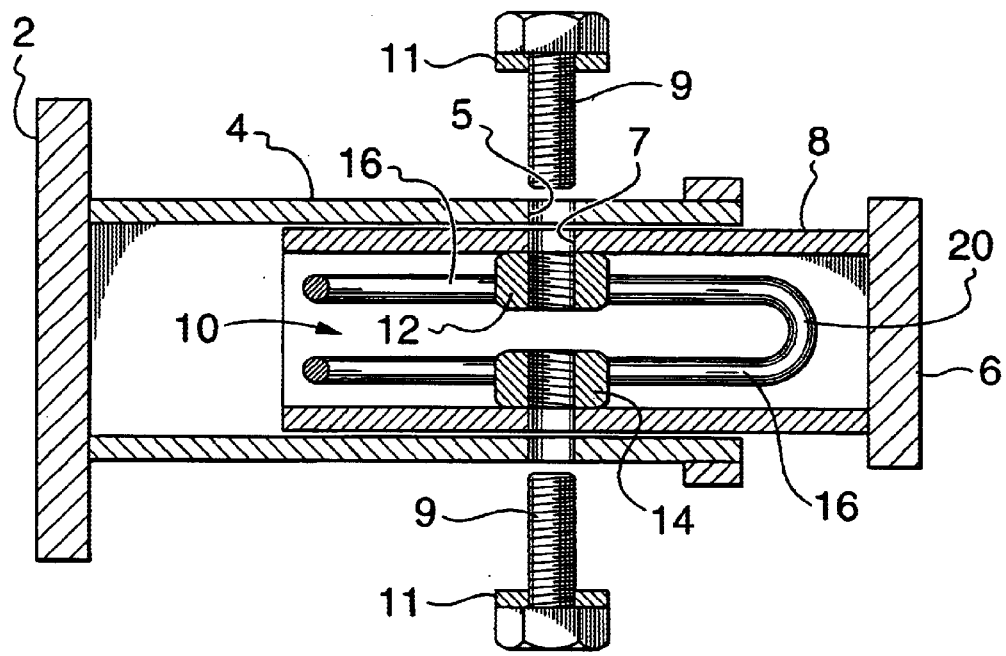
FIG. 4 illustrates a section view taken along section lines A—A of FIG. 3.

FIG. 4 illustrates a section view taken only section lines A–A of FIG. 3. As seen in FIG. 4, the spring rod 16 of the securing device 10 as seen in this plane, is constructed in the shape of a "U" with a pair of securing nuts 12, 14 located in the mid region of each parallel arm of the spring rod 16 of the securing device 10. The pair of nuts 12, 14 are welded respectively to the pair of parallel arms of the spring rod 16 framework of the securing device 10 by welds 18. As is also illustrated in FIG. 4, the pair of side bolt holes 5 of the outer hitch receiver tube 4 and the respective holes 7 of the inner implement tube 8, and the respective threaded holes in the pair of nuts 12, 14, are aligned so as to receive the threads and stems of a pair of securing bolts 9 with washers 11.

Figure 5:
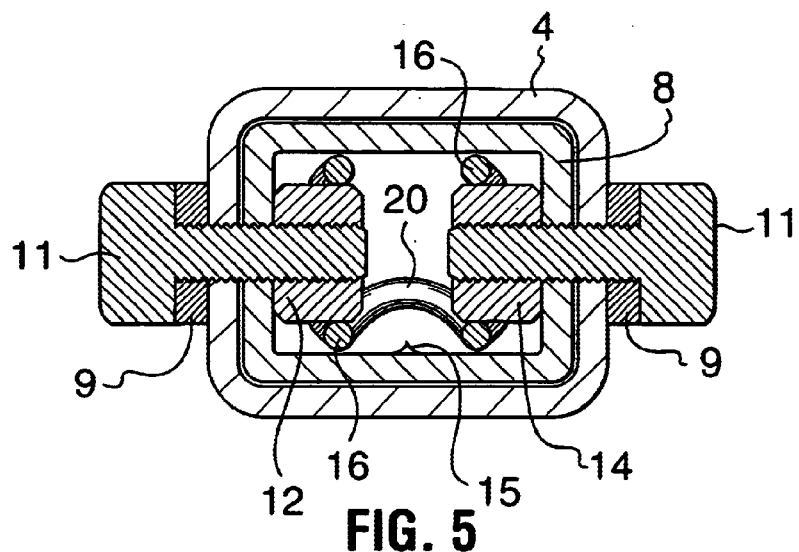
FIG. 5 illustrates a section view taken along section lines B—B of FIG.3.

FIG. 5 illustrates a section view taken along section lines B—B of FIG. 3. This figure clearly shows the hollow square cross-section inner implement tube 8 held within the hollow square cross-section outer hitch receiver tube 4. It also shows the securing device 10 with the pair of parallel aligned nuts 12 and 14 aligned with the side bolt holes 5 and 7. The nuts 12 and 14 are held in place in the interior of the square implement tube 8 by the spring rods 16.

The base of the interior of the square cross-section inner implement tube 8 typically has a protruding flashing 15. The securing device 10 has an upwardly curved nose 20 to avoid jamming against the flashing 15 when the securing device 10 is inserted into the inner implement tube 8.

Figure 6:
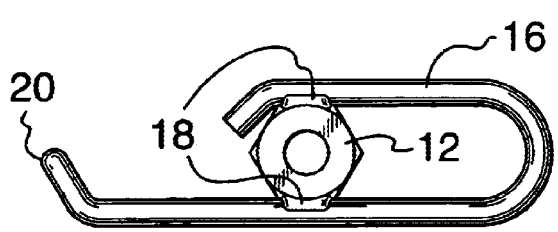
FIG. 6 illustrates a side view of the securing device.

FIG. 6 illustrates a side view of the securing device 10, with double "U"-shaped spring rod 16 and nut 12 welded by weld 18 to spring rod 16. The figure also illustrates the curved nose 20 which facilitates insertion of the securing device into the inner implement tube 8.

Figure 7:
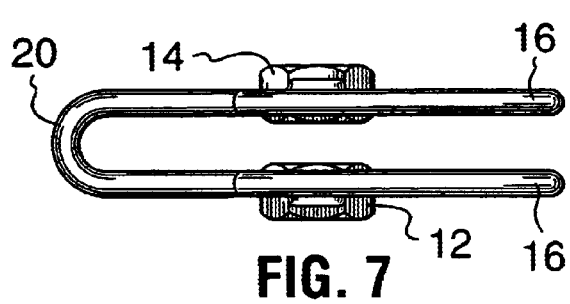
FIG. 7 illustrates a top view of the securing device.

FIG. 7 illustrates a top view of the securing device 10, and the double "U"-shaped spring rod 16 curved at nose 20 in the shape of a "U". The pair of parallel aligned nuts 12 and 14 are held in the mid region of the parallel arms of the spring rod 16.

Figure 8:
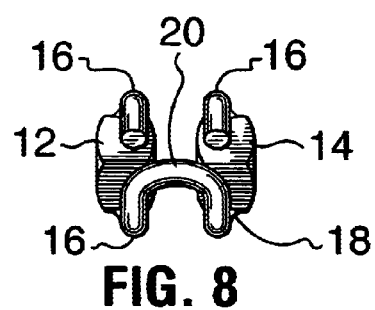
FIG. 8 illustrates a front view of the securing device.

FIG. 8 illustrates a front view of the securing device 10 with the pair of nuts 12 and 14 held in spaced, parallel, aligned orientation, within the arms of the double "U"-shaped spring rod 16 by welds 18.

Figure 9:
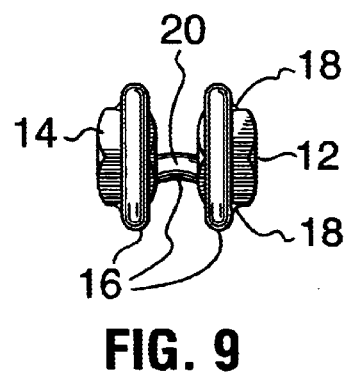
FIG. 9 illustrates a rear view of the securing device.

FIG. 9 illustrates a rear view of the securing device 10. This figure in particular illustrates the parallel relationship between the two main arms of the double "U-shaped" spring rod 16 and the aligned pair of nuts 12 and 14 held respectively in the two parallel arms of the spring rod 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for removably securing an implement to a hitch receiver comprising:
   (a) a resilient elongated double "U"-shaped frame which at a first central location bends in a "U"-shape along a first plane, and the pair of arms of the frame at a pair of complementary second locations on the frame, bend in a pair of "U"-shapes in parallel along a second plane perpendicular to the first plane;
   (b) a first nut secured within one of the arms of the second "U"-shape; and
   (c) a second nut secured within the other of the arms of the second "U"-shape, the first and second nuts being spaced and aligned in parallel arrangement with one another.

2. A device as claimed in claim 1 including a first bolt and a second bolt threaded to mate respectively with the first nut and the second nut.

3. A device as claimed in claim 2 including first and second lock washers for the first and second nuts.

* * * * *